United States Patent
Szor

(10) Patent No.: US 7,340,777 B1
(45) Date of Patent: Mar. 4, 2008

(54) IN MEMORY HEURISTIC SYSTEM AND METHOD FOR DETECTING VIRUSES

(75) Inventor: Peter Szor, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 897 days.

(21) Appl. No.: 10/404,167

(22) Filed: Mar. 31, 2003

(51) Int. Cl.
*H04L 9/00* (2006.01)

(52) U.S. Cl. .......................... 726/26; 726/22; 726/23; 726/24; 713/165; 713/167; 713/188

(58) Field of Classification Search ................. None
See application file for complete search history.

(56) References Cited

U.S. PATENT DOCUMENTS

| | | | | |
|---|---|---|---|---|
| 5,274,819 | A * | 12/1993 | Blomfield-Brown | 718/100 |
| 5,361,359 | A * | 11/1994 | Tajalli et al. | 726/23 |
| 5,367,682 | A | 11/1994 | Chang | 395/700 |
| 5,398,196 | A * | 3/1995 | Chambers | 714/28 |
| 5,696,822 | A | 12/1997 | Nachenberg | 380/4 |
| 5,822,517 | A | 10/1998 | Dotan | 395/186 |
| 6,275,938 | B1 * | 8/2001 | Bond et al. | 726/23 |
| 6,301,699 | B1 | 10/2001 | Hollander et al. | 717/4 |
| 6,357,008 | B1 | 3/2002 | Nachenberg | 713/200 |
| 6,480,962 | B1 | 11/2002 | Touboul | 713/200 |
| 6,577,920 | B1 | 6/2003 | Hyppönen et al. | 700/200 |
| 6,775,780 | B1 | 8/2004 | Muttik | 713/200 |
| 7,028,305 | B2 * | 4/2006 | Schaefer | 719/310 |
| 7,069,581 | B2 | 6/2006 | Fu et al. | 726/3 |
| 7,085,928 | B1 * | 8/2006 | Schmid et al. | 713/164 |

OTHER PUBLICATIONS

Farmer, D., et al, 'Forensic Discovery', Addison Wesley Professional, Dec. 30, 2004, entire document, http://www.porcupine.org/forensics/forensic-discovery/chapter6.html.*

Szor, P., "*Attacks on WIN32*", Virus Bulletin Conference, Oct. 1998, Virus Bulletin Ltd., The Pentagon, Abingdon, Oxfordshire, England, pp. 57-84.

Szor, P., "*Memory Scanning Under Windows NT*", Virus Bulletin Conference, Sep. 1999, Virus Bulletin Ltd., The Pentagon, Abingdon, Oxfordshire, England, pp. 1-22.

Szor, P., "*Attacks on WIN32-Part II*", Virus Bulletin Conference, Sep. 2000, Virus Bulletin Ltd., The Pentagon, Abingdon, Oxfordshire, England, pp. 47-68.

Chien, E. and Szor, P., "*Blended Attacks Exploits, Vulnerabilities and Buffer-Overflow Techniques In Computer Viruses*", Virus Bulletin Conference, Sep. 2002, Virus Bulletin Ltd., The Pentagon, Abingdon, Oxfordshire, England, pp. 1-36.

(Continued)

*Primary Examiner*—Nasser Moazzami
*Assistant Examiner*—Ronald Baum
(74) *Attorney, Agent, or Firm*—Gunnison, McKay & Hodgson, L.L.P.; Serge J. Hodgson

(57) ABSTRACT

Characteristics of a call module originating a critical operating system function call are analyzed for indications of suspicious content and a virus threshold counter is incremented appropriately. For example, the memory image to the file image of the call module are compared for indications of suspicious content. If a determination is made that the virus threshold counter exceeds a virus threshold, there is a significant probability that malicious code is executing on the host computer system. Thus, the user of the host computer system and/or an administrator are notified that malicious code is possibly executing on the host computer system.

28 Claims, 11 Drawing Sheets

OTHER PUBLICATIONS

Buysse, J., "*Virtual Memory: Window NT® Implementation*", pp. 1-15 [online]. Retrieved on Apr. 16, 2003. Retrieved from the Internet: <URL:http://people.msoe.edu/~barnicks/courses/cs384/papers19992000/buyssej-Term.pdf>.

Dabak, P., Borate, M. and Phadke, S., "*Hooking Windows NT System Services*", pp. 1-8 [online]. Retrieved on Apr. 16, 2003. Retrieved from the Internet:<URL:http://www.windowsitlibrary.com/Content/356/06/2.html>.

"*How Entercept Protects: System Call Interception*", pp. 1-2 [online]. Retrieved on Apr. 16, 2003. Retrieved from the Internet:<URL:http://www.entercept.com/products/technology/kernelmode.asp>. No author provided.

"*How Entercept Protects: System Call Interception*", p. 1 [online]. Retrieved on Apr. 16, 2003. Retrieved from the Internet:<URL:http://www.entercept.com/products/technology/interception.asp>. No author provided.

Kath, R., "*The Virtual-Memory Manager in Windows NT*", pp. 1-11 [online]. Retrieved on Apr. 16, 2003. Retrieved from the Internet:<URL:http://msdn.microsoft.com/library/en-us/dngenlib/html/msdn_ntvmm.asp?frame=true>.

Szor, P. and Kaspersky, E., "*The Evolution of 32-Bit Windows Viruses*", Windows & .NET Magazine, pp. 1-4 [online]. Retrieved on Apr. 16, 2003. Retrieved from the Internet:<URL:http://www.winnetmag.com/Articles/Print.cfm?ArticleID=8773>.

Szor, P., "*The New 32-bit Medusa*", Virus Bulletin, Dec. 2000, Virus Bulletin Ltd., The Pentagon, Abingdon, Oxfordshire, England, pp. 8-10.

Szor, P., "*Shelling Out*", Virus Bulletin, Feb. 1997, Virus Bulletin Ltd., The Pentagon, Abingdon, Oxfordshire, England, pp. 6-7.

McCorkendale, B. and Szor, P., "*Code Red Buffer Overflow*", Virus Bulletin, Sep. 2001, Virus Bulletin Ltd., The Pentagon, Abingdon, Oxfordshire, England, pp. 4-5.

Nachenberg, C., "*A New Technique for Detecting Polymorphic Computer Viruses*", University of California, Los Angeles, 1995.

\* cited by examiner

Process 216D

Key to FIG. 7

IN MEMORY HEURISTIC SYSTEM AND METHOD FOR DETECTING VIRUSES

BACKGROUND OF THE INVENTION

1. Field of the Invention

The present invention relates to the protection of computer systems. More particularly, the present invention relates to a virus detection system and method.

2. Description of the Related Art

Anti-virus companies are adding memory scanning of known viruses to anti-virus products. There are two types of memory scanning that are available, on demand and on access scanning.

An on demand scanner is one that must be explicitly launched by the user or by a program scheduler. The on demand scheduler scans each process' memory as well as the memory in the kernel space for known viruses. An on access memory scanner scans new programs for known viruses as they are loaded into the memory.

However, because the scanner only searches for known viruses, the scanner may miss any unknown, encrypted, polymorphic, and entry point obscuring viruses.

SUMMARY OF THE INVENTION

In accordance with one embodiment, characteristics of a call module originating a critical operating system function call are analyzed for indications of suspicious content and a virus threshold counter is incremented appropriately. If a determination is made that the virus threshold counter exceeds a virus threshold, there is a significant probability that malicious code is executing on the host computer system. Thus, the user of the host computer system and/or an administrator are notified that malicious code is possibly executing on the host computer system.

In one embodiment, the user and/or the administrator are asked to submit a sample of the malicious code to a virus collection center for further analysis. In this manner, viruses, including ordinary 32-bit Windows® viruses, known, unknown, encrypted, polymorphic, and entry point obscuring viruses are detected and samples of the viruses are collected.

Also in accordance with one embodiment of the present invention, an on-demand comparison of the memory image to the file image of active applications is performed and a virus threshold counter is incremented appropriately. If a determination is made that the virus threshold counter exceeds a virus threshold, again there is a significant probability that malicious code is executing on the host computer system and a notification is generated.

In accordance with another embodiment of the present invention, an on-demand analysis of the characteristics of hook modules for indications of suspicious content is performed and a virus threshold counter is incremented appropriately.

More particularly, a hook module includes an instruction or set of instructions, which hook operating system functions. Many viruses hook operating system functions. By analyzing the hook module characteristics and incrementing the virus threshold counter appropriately, malicious code is easily detected.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Figure 1:
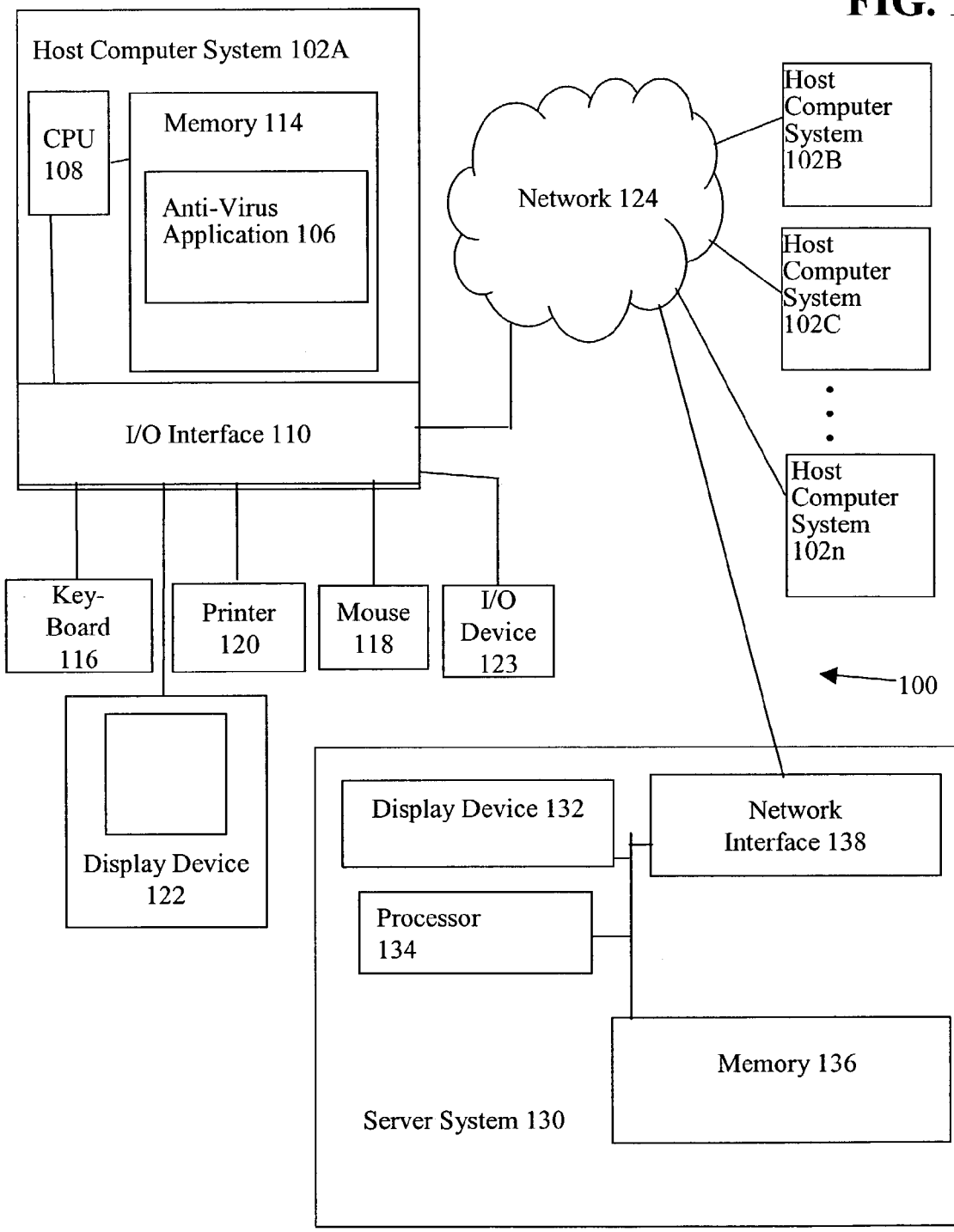
FIG. 1 is a diagram of a client-server system that includes an anti-virus application executing on a host computer system in accordance with one embodiment of the present invention.
Figure 2:
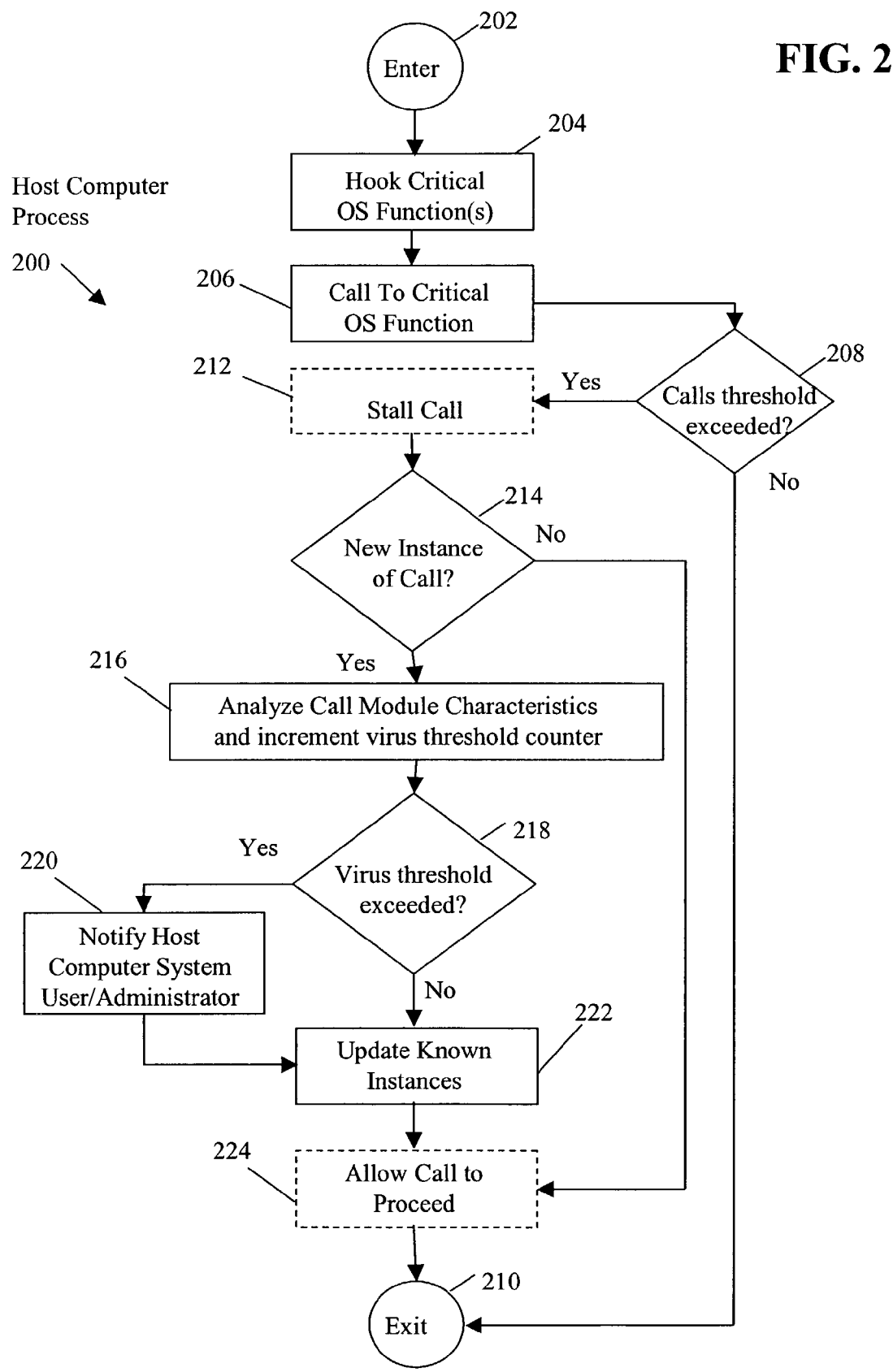
FIG. 2 is a flow diagram of a host computer process in accordance with one embodiment of the present invention.
Figure 3:
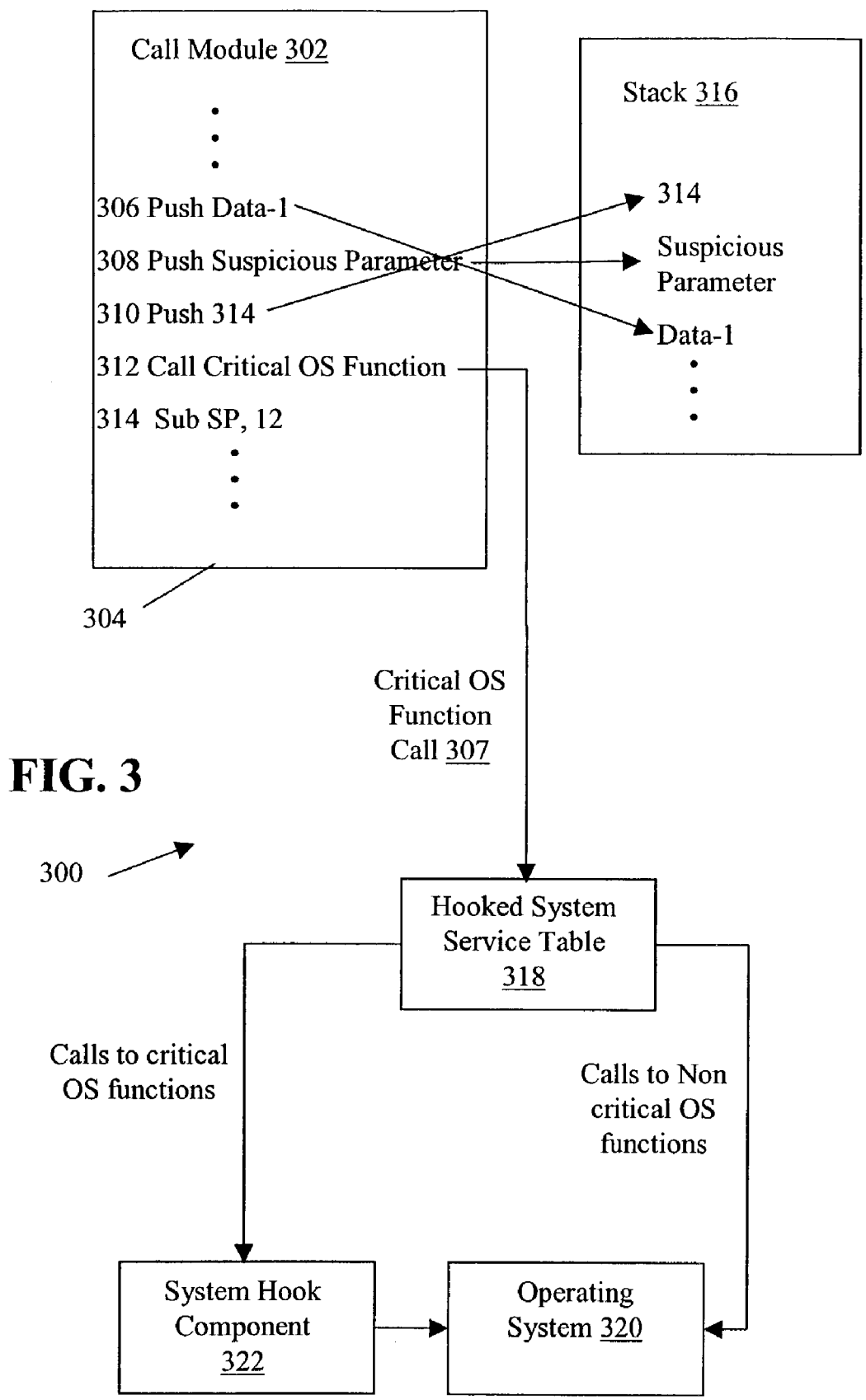
FIG. 3 is a diagram of a hooked operating system function call flow in accordance with one embodiment of the present invention.

In accordance with one embodiment, referring to FIGS. 1, 2 and 3 together, characteristics of a call module 302 originating a critical operating system function call 307 are analyzed for indications of suspicious content, e.g., the suspicious parameter of instruction 308 of call module 302, in an analyze call module characteristics and increment virus threshold counter operation 216 and a virus threshold counter is incremented appropriately.

If a determination is made that the virus threshold counter exceeds a virus threshold in virus threshold exceeded check operation 218, there is a significant probability that malicious code is executing on host computer system 102A. Thus, in a notify host computer system user/administrator operation 220, the user of host computer system 102A and/or the administrator are notified that malicious code is possibly executing on host computer system 102A.

In one embodiment, in notify host computer system user/administrator operation 220, the user and/or the administrator are asked to submit a sample of the malicious code to a virus collection center for further analysis. In this manner, viruses, including ordinary 32-bit Windows® viruses, known, unknown, encrypted, polymorphic, and entry point obscuring viruses are detected and samples of the viruses are collected.

More particularly, FIG. 1 is a diagram of a client-server system 100 that includes an anti-virus application 106 executing on a host computer system 102A, e.g., a first computer system, in accordance with one embodiment of the present invention. Host computer system 102A can be a stand-alone system, such as a personal computer or workstation, as illustrated schematically in FIG. 1 by host computer system 102A. Host computer system 102A can also be part of a client-server configuration 100 that is also illustrated in FIG. 1 in which host computer system 102A interacts with a server system 130 via a network 124, such as the Internet.

Host computer system 102A, sometimes called a client or user device, typically includes a central processing unit (CPU) 108, hereinafter processor 108, an input output (I/O) interface 110, and a memory 114. Host computer system 102A may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102A. In one embodiment, anti-virus application 106 is loaded into host computer system 102A via I/O device 123, such as from a CD, DVD or floppy disk containing anti-virus application 106.

In one embodiment, memory 114 includes a page based virtual memory system that uses pages, e.g., memory areas. Pages have individual properties such as, for example, that they are writable and/or read-only executable.

A page is writable if it is marked as writable, i.e., is marked as a page for storage of data. Examples of writable pages include the stack and heap. A page is read-only executable if it is not marked as writable, but marked executable.

In one embodiment, a set of flags describe the properties of a page. For example, these flags are maintained in the pages tables or in other operating system managed lists or databases.

For example, Windows® NT and Windows® 2000 are 32-bit operating systems widely used on home and business computer systems. Windows® NT and Windows® 2000 provide page-based virtual memory management schemes that permit programs to realize a 4 GB (gigabyte) virtual memory address space. In one embodiment, when processor 108 is running in virtual memory mode, all addresses are assumed to be virtual addresses and are translated, or mapped, to physical addresses in main memory each time processor 108 executes a new instruction to access memory.

Conventionally, the 4 GB virtual memory address space is divided into two parts: a lower 2 GB user address space, also referred to as user mode address space or ring 3, available for use by a program; and, a high 2 GB system address space, also referred to as kernel address space or ring 0, reserved for use by the operating system.

To protect the integrity of the operating system code and other kernel address space code and data structures from errant or malicious programs and to provide efficient system security (user rights management), Windows® NT and Windows® 2000 separate code executing in the user address space, e.g., user mode, from code executing in the kernel address space, e.g., kernel mode. User mode code typically does not have direct access to kernel mode code and has restricted access to computer system resources and hardware. To utilize kernel mode code functionalities, such as access to disk drives and network connections, user mode programs utilize system calls, sometimes called operating system (OS) function calls, that interface between the user mode and kernel mode functions.

In Windows® NT and Windows® 2000, memory is divided into equal portions termed pages. For example, on 32-bit Intel architectures, also known as IA32, pages are 4 KB in size, whereas Windows® 2000 on an Alpha CPU would use 8 KB pages.

Host computer system 102A is coupled to server system 130 of client-server system 100 by network 124. Server system 130 typically includes a display device 132, a processor 134, a memory 136, and a network interface 138. In one embodiment, as illustrated in FIG. 1, a plurality of host computer systems 102B, 102C, . . . , 102*n* similar to host computer system 102A are coupled to server system 130 by network 124.

Network 124 can be any network or network system that is of interest to a user. In various embodiments, network interface 138 and I/O interface 110 include analog modems, digital modems, or a network interface card.

Anti-virus application 106 is stored in memory 114 of host computer system 102A and executed on host computer system 102A. The particular type of and configuration of host computer system 102A, host computer systems 102B, 102C 102*n*, and server system 130 are not essential to this embodiment of the present invention.

FIG. 2 is a flow diagram of a host computer process 200 in accordance with one embodiment of the present invention. Referring now to FIGS. 1 and 2 together, execution of anti-virus application 106 by processor 108 results in the operations of host computer process 200 as described below in one embodiment.

From an enter operation 202, flow moves to a hook critical operating system (OS) function(s) operation 204. In hook critical OS function(s) operation 204, the critical operating system functions, e.g., at least one critical operating system function, of host computer system 102A are hooked. In one embodiment, a system level, e.g., a kernel mode module or kernel mode driver, hooks the critical operating system functions. Further, in one embodiment, an operating system function is hooked by redirecting calls to the operating system function, for example, to a system hook component in accordance with one embodiment of the present invention.

In one embodiment, an operating system function is critical if use of the operating system function is critical for operation or mischief in a large number of malicious applications, i.e., containing malicious code. In one embodiment, malicious code is defined as any computer program, module, set of modules, or code that enters a computer system without an authorized user's knowledge and/or without an authorized user's consent.

In addition, in one embodiment, an operating system function is critical if the use of the operating system function does not occur often so that monitoring the operating system function will not result in marked system slowdown.

Illustrative, examples of critical operating system functions include the "CreateFileA( )", "GetProcAddress( )", "FindFirstFileA( )", "FindNextFileA( )", "WriteFile( )" operating system functions. To further illustrate, definitions of critical operation system functions are updated by periodic downloads of the definitions.

As is well known to those of skill in the art and discussed above, system calls expose all kernel functionality that user-mode programs require. User-mode programs need to utilize the functionality provided by the kernel, for example, to access disk drives, network connections, and shared memory. More particularly, because the processor prevents direct access to kernel mode functions by user-mode programs, user-mode programs use system calls, which form the only permitted interface between user-mode and kernel mode. In accordance with one embodiment, system calls include critical OS function calls and non-critical OS function calls.

From hook critical OS function(s) operation 204, flow moves to a call to critical OS function operation 206. In call to critical OS function operation 206, a call to a critical OS function is made by a call module of a host application.

In accordance with one embodiment of the present invention, a call module includes the critical OS function call instruction(s), i.e., the instruction or set of instructions that originates the critical OS function call. The call module may be malicious or non-malicious.

Further, the host application includes the call module, or, in one embodiment, the host application is the call module. The host application may be malicious or non-malicious.

Referring still to call to critical OS function operation 206, a first critical OS function call is made by a call module of a host application to an OS function that was hooked in hook critical OS function(s) operation 204.

From call to critical OS function operation 206, flow moves to a calls threshold exceeded check operation 208. In calls threshold exceeded check operation 208, a determination is made as to whether a calls threshold has been exceeded. The calls threshold is a value indicative of the minimum amount of critical OS function call activity sufficient to cause suspicion that a malicious application, sometimes called a malicious program, is active on host computer system 102A. To illustrate, in one embodiment, a single critical OS function call to any critical operating system function exceeds the calls threshold.

However, in another embodiment, a single critical OS function call but only to a critical operating system function necessary for a malicious program to replicate, sometimes called a high threat critical operating system function, exceeds the calls threshold. In accordance with this embodiment, a single critical OS function call to a critical operating system function rarely used by a malicious program to replicate, sometimes called a low threat critical operating system function, does not exceed the calls threshold. However, a plurality of low threat critical OS function calls exceeds the calls threshold.

Illustratively, a calls threshold counter is incremented for each critical OS function call and compared to the calls threshold. If the particular critical OS function call causes the call threshold counter to exceed the calls threshold, a determination is made that the calls threshold has been exceeded.

As is well known to those of skill in the art, once a virus, e.g., a polymorphic or encrypted virus, or other malicious code is introduced onto a computer system, the virus will decrypt itself if necessary in the virtual memory and become active. Because the virus has decrypted itself in the virtual memory when originating a critical OS function call, the actual encryption method used by the virus is of little or no significance to host computer process 200.

If a determination is made that the calls threshold has not been exceeded in calls threshold exceeded check operation 208, flow moves to an exit operation 210 or returns to call to critical OS function operation 206 to await the next critical OS function call. However, if a determination is made that the calls threshold has been exceeded in calls threshold exceeded check operation 208, flow moves to, optionally, a stall call operation 212.

In stall call operation 212, the critical OS function call of operation 206 to the critical OS function is stalled, i.e., is prevented from reaching the operating system. By stalling the critical OS function call, execution of the critical OS function is stalled.

From stall call operation 212, flow moves to a new instance of call check operation 214. In new instance of call check operation 214, a determination is made as to whether the critical OS function call is a new instance of the critical OS function call. For simplicity of discussion, a new instance of a critical OS function call is sometimes referred to as simply a new instance.

In one embodiment, each critical OS function call has characteristics such as the process identification (PID) associated with the call module, the virtual address (VA) of the call module, the critical OS function called by the call module, sometimes called the application programming interface (API), and the page characteristics of the page of the call module, e.g., read-only executable or writable. The characteristics of each critical OS function call, hereinafter the critical OS function call characteristics, are logged, for example, in a database.

The critical OS function call characteristics for the critical OS function call are compared to the critical OS function call characteristics of the previous critical OS function calls to determine if the critical OS function call is a new instance.

In one embodiment, if the PID and the VA of the critical OS function call matches the PID and the VA of a previous critical OS function call, the critical OS function call is not a new instance. For example, if an application loops through the same call module, a plurality of critical OS function calls having the same PID and VA will be generated.

In another embodiment, if the VA of the critical OS function call matches the VA of a previous critical OS function call, the critical OS function call is not a new instance. For example, if there are multiple copies of an application executing simultaneously, a plurality of critical OS function calls having the same VA, although different PID, will be generated.

If a determination is made that there is a new instance of the call in new instance of call check operation 214, flow moves to an analyze call module characteristics and increment virus threshold counter operation 216, sometimes called operation 216. In operation 216, (1) the characteristics of the call module are analyzed for indications of suspicious content and a virus threshold counter is incremented appropriately; (2) the characteristics of the call module are compared to other call module characteristics for indications of suspicious content and the virus threshold counter is incremented appropriately; (3) the characteristics of the host application of the call module are compared to the previous characteristics of the host application of the call module for indications of suspicious content and the virus threshold counter is incremented appropriately; and/or (4) the memory and file image of the call module are compared to each other for indications of suspicious content and the virus threshold counter is incremented appropriately as discussed below in reference to FIGS. 4, 5, 6, and 7 (FIGS. 7A and 7B are collectively referred to as FIG. 7), respectively.

From operation 216, flow moves to virus threshold exceeded check operation 218. In virus threshold exceeded check operation 218, a determination is made as to whether a virus threshold is exceeded. In one embodiment, if the virus threshold counter exceeds the virus threshold, a determination is made that the virus threshold is exceeded in virus threshold exceeded check operation 218.

If a determination is made that the virus threshold is exceeded in virus threshold exceeded check operation 218, flow moves from virus threshold exceeded check operation 218 to a notify host computer system user/administrator operation 220. In this event, there is a significant probability that malicious code is executing on host computer system 102A. Thus, in notify host computer system user/administrator operation 220, the user of host computer system 102A and/or the administrator are notified that malicious code is possibly executing on host computer system 102A. The user and/or administrator can be notified using any one of a number of techniques, e.g., by using a pop up window, by writing to a file and/or otherwise by logging the event.

In one embodiment, in notify host computer system user/administrator operation 220, the user and/or the administrator are asked to submit a sample of the malicious code to a virus collection center for further analysis. In this manner, viruses, including ordinary 32-bit Windows® viruses, known, unknown, encrypted, polymorphic, and entry point obscuring viruses are detected and samples of the viruses are collected. For example, W32.CTX, W32.Dengue viruses are detected and samples of the viruses are collected.

If a determination is made that the virus threshold is not exceeded in virus threshold exceeded check operation 218, or from notify host computer system user/administrator operation 220, flow moves to an update known instances operation 222.

In update known instances operation 222, the critical OS function call characteristics of the critical OS function call are logged, for example, in a database. As discussed above in regards to new instance of call check operation 214, the critical OS function call characteristics for each critical OS function call is compared to the critical OS function call characteristics of the previous critical OS function calls to determine if the critical OS function call is a new instance.

From update known instances operation 222, flow moves to, optionally, an allow call to proceed operation 224. In allow call to proceed operation 224, the critical OS function call is allowed to proceed. More particularly, the critical OS function call is passed to the operating system. As discussed above, the critical OS function call was stalled in stall call operation 212. From allow call to proceed operation 224, flow moves to and exits at exit operation 210 or waits for the next critical OS function call and returns to operation 206.

Stall call operation 212 and allow call to proceed operation 224 are optional and in one embodiment are not performed. In accordance with this embodiment, flow moves directly to operation 214 instead of operation 212 and directly to operation 210 instead of operation 224.

Returning again to new instance of call check operation 214, if a determination is made that the critical OS function call is not a new instance, then flow moves directly to allow call to proceed operation 224, which is performed as discussed above.

FIG. 3 is a diagram of a hooked operating system function call flow 300 in accordance with one embodiment of the present invention. Referring now to FIG. 3, a call module 302, e.g., a malicious or non-malicious call module, is in a page 304 of memory. Page 304 is a user or kernel mode page in one embodiment.

Call module 302 includes instructions 306, 308 and 310 that push Data-1, Suspicious parameter and return pointer 314, respectively, on to a stack 316. Call module 302 further includes an instruction 312 that calls a critical OS function and an instruction 314 that decrements the stack pointer for cleanup of stack 316 as those of skill in the art will understand.

Execution of instructions 306, 308 and 310 push Data-1, Suspicious parameter and return pointer 314, respectively, on to stack 316 as shown by the arrows. Execution of instruction 312 causes a critical OS function call 307 to a critical OS function to be made. In one embodiment, call module 302 originates a call to a critical OS function during call to critical OS function operation 206 of FIG. 2 in the above manner.

In one embodiment, call module 302 originates critical OS function call 307 by making critical OS function call 307 directly. In another embodiment, call module 302 originates critical OS function call 307 by calling another function, e.g., a subroutine, which, in turn, makes critical OS function call 307.

Critical OS function call 307 is routed to a hooked system service table 318. Hooked system service table 318 routes noncritical OS function calls directly to an operating system 320. However, hooked system service table 318 routes critical OS function calls to a system hook component 322, e.g., a kernel mode module or kernel mode driver.

As is well known to those of skill in the art, a system service table, sometimes called a dispatch table or a system call table, relates system calls to specific addresses within the operating system kernel. Hooked system service table 318 in accordance with one embodiment of the present invention, redirects critical OS function calls to system hook component 322 and from the specific addresses within the operating system kernel to which the critical OS function calls would otherwise be directed.

Critical OS function call 307 is routed by hooked system service table 318 to system hook component 322. Critical OS function call 307 is stalled by system hook component 322 in stall call operation 212. Operation 214 or operations 214, . . . , 222 are performed as discussed above in reference to FIG. 2 and flow moves to allow call to proceed operation 224. System hook component 322 allows critical OS function call 307 to proceed in allow call to proceed operation 224. Accordingly, critical OS function call 307 is routed from system hook component 322 to operating system 320.

Although FIG. 3 describes one example of a hooked operating system function call path, in light of this disclosure, those of skill in the art will understand that other techniques can be used to hook operating system function(s). The particular technique used depends, for example, on the particular operating system.

Figure 4:
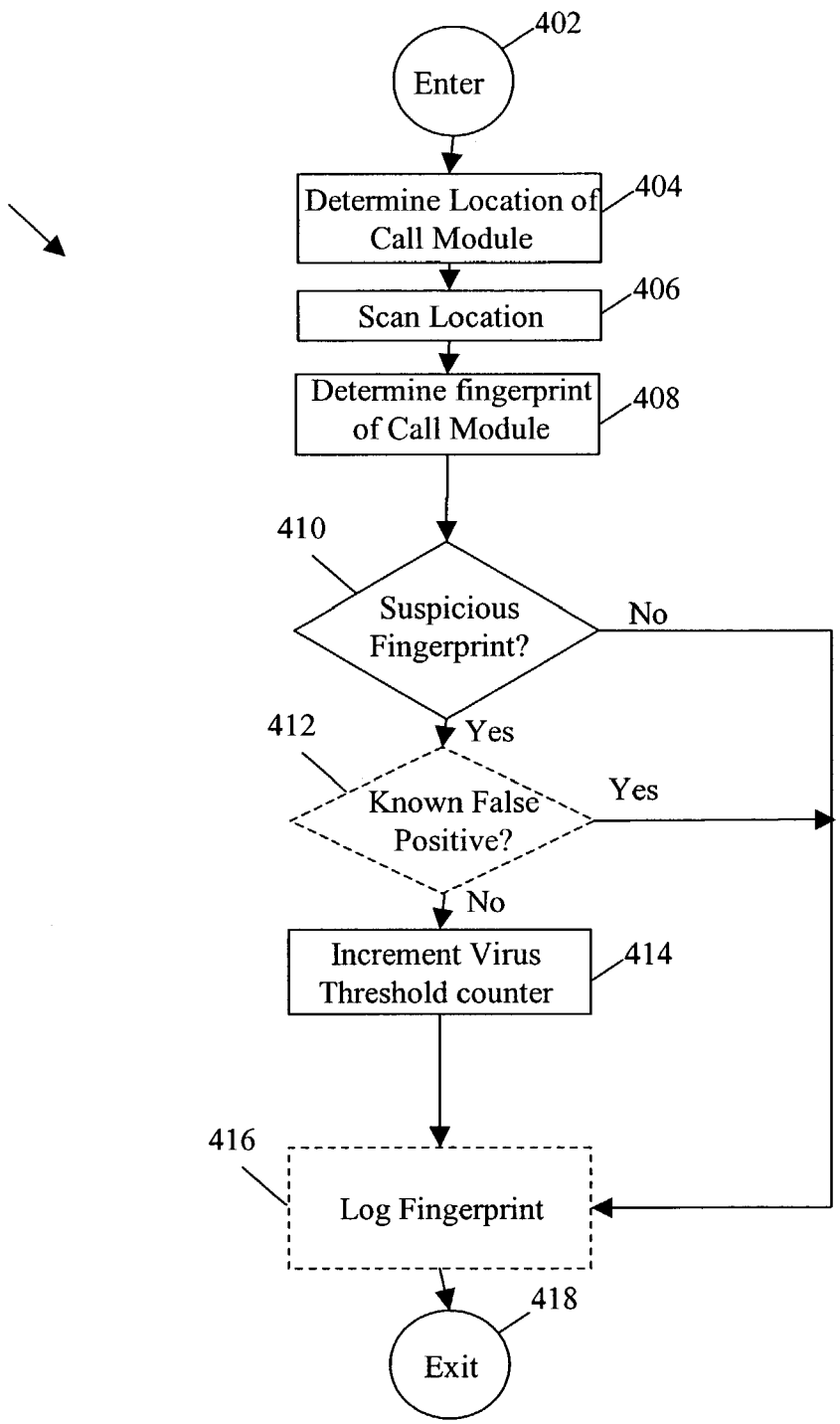
FIGS. 4, 5 and 6 are flow diagrams of processes of an analyze call module characteristics and increment virus threshold counter operation of FIG. 2 in accordance with various embodiments of the present invention.

FIG. 4 is a flow diagram of a process 216A of analyze call module characteristics and increment virus threshold counter operation 216 of FIG. 2 in accordance with one embodiment of the present invention. Referring now to FIGS. 2, 3 and 4 together, from an enter operation 402, flow moves to a determine location of call module operation 404. In determine location of call module operation 404, the location in memory, e.g., the page or plurality of pages, of the call module or near the call module that originated the critical OS function call of operation 206 to the critical OS function is determined. In one embodiment, API hooking functionality or a stack trace-back operation, e.g., a stack analyzer routine, is used to determine the location in memory of the call module.

Further, in one embodiment, the size of the location in memory is determined by the characteristics of the location. For example, writable pages suggest that self-modifying code was executed. Thus, writable pages will be considered more suspicious than read-only executable pages. Thus, if the location in memory of the call module or near the call module is in a writable page, the location will be selected to be a larger area of the memory than if the location was in a read-only executable page resulting in a larger amount of code analysis than if the location is in a read-only executable area.

To illustrate, in determine location of call module operation 404, the location, i.e., page 304, in memory of call module 302 or near call module 302 is determined. In accordance with this embodiment, determine location of call module operation 404 is performed by analyzing the content of stack 316. More particularly, the content of stack 316 is analyzed to locate return pointer 314, which points to call module 302. More generally, return pointer 314 points to page 304.

Although FIG. 4 describes one example of pseudocode representation of a stack 316 used to determine the location in memory, i.e., page 304, of call module 302, in light of this disclosure, those of skill in the art will understand that other techniques can be used to determine the location of a call module that originated a critical OS function call. The particular technique used depends, for example, on the particular operating system.

From determine location of call module operation 404, flow moves to a scan location operation 406. In scan location operation 406, the location, e.g., page(s) of memory, of the call module is scanned so that the content of the location including the call module is acquired. Illustratively, the location is scanned manually or the scanning is automated by using a scanner knowledgeable about the virus body locations in infected files. For example, in the embodiment illustrated in FIG. 3, page 304 is scanned in scan location operation 406. Because only the location of the call module is scanned, the performance hit which would otherwise be associated with scanning the entire memory is avoided.

From scan location operation 406, flow moves to a determine fingerprint of call module operation 408. In determine fingerprint of call module operation 408, the fingerprint, sometimes called characteristics, of the location including the call module is determined. Illustratively, the fingerprint includes code fragments or other characteristics of the location. For example, in the embodiment illustrated FIG. 3, it is determined that page 304 includes a suspicious parameter in instruction 308 in determine fingerprint of call module operation 408.

From determine fingerprint of call module operation 408, flow moves to a suspicious fingerprint check operation 410. In suspicious fingerprint check operation 410, a determination is made as to whether the fingerprint is suspicious, i.e., indicates that the location of the call module may contain malicious code. Illustratively, if the fingerprint includes any suspicious code fragments, a determination is made that the fingerprint is suspicious.

In one embodiment, a suspicious code fragment is a code fragment indicative of malicious code. Examples of suspicious code fragments include: 1) suspicious API names, 2) E8000000005B code sequence; 3) CMP reg, MZ? ->EXE file check?; 4) CMP reg, PE? ->PE file check?; 5) Kernel API addresses if originating from kernel locations; 6) names of known virus writers; 7) dirty words; 8) address comparisons made against KERNEL32.DLL base addresses; and 9) direct use of undocumented interfaces such as VxDCALL ids.

To illustrate, in the embodiment illustrated FIG. 3, a determination is made that page 304 includes a suspicious parameter and thus has a suspicious fingerprint in suspicious fingerprint check operation 410.

Upon a determination that the fingerprint is suspicious in suspicious fingerprint check operation 410, flow moves to, optionally, a known false positive check operation 412. In known false positive check operation 412, a determination is made as to whether the fingerprint, which has been determine to be suspicious in suspicious fingerprint check operation 410, is a known false positive suspicious fingerprint. In one embodiment, a known false positive suspicious fingerprint is a fingerprint that is suspicious, i.e., indicates that the location or call module may contain malicious code, but that is, in fact, safe, i.e., does not contain malicious code. Known false positive check operation 412 is optional and in one embodiment is not performed.

For example, in the embodiment illustrated FIG. 3, a determination is made that the existence of a suspicious parameter in instruction 308 is not a known false positive in known false positive check operation 412.

If a determination is made that the fingerprint is not a known false positive suspicious fingerprint in known false positive check operation 412, flow moves to an increment virus threshold counter operation 414. In increment virus threshold counter operation 414, a virus threshold counter is incremented.

In one embodiment, each particular suspicious code fragment gets a different increment value. Thus, depending upon the particular suspicious code fragment, the virus threshold counter gets incremented more or less.

In one embodiment, the virus threshold counter is indicative of the level of suspicion that malicious code is executing on host computer system 102A. As discussed above in reference to virus threshold exceeded check operation 218 of FIG. 2, if the virus threshold counter exceeds the virus threshold, the host computer system user/administrator are notified that malicious code is possibly executing on host computer system 102A in notify host computer system user/administrator operation 220.

For example, in the embodiment illustrated FIG. 3, because a determination is made that the existence of a suspicious parameter in instruction 308 is not a known false positive in known false positive check operation 412, the virus threshold counter is incremented in increment virus threshold counter operation 414.

Flow moves from increment virus threshold counter operation 414, optionally, to a log fingerprint operation 416. In log fingerprint operation 416, the fingerprint is logged, e.g., in a database. This allows the fingerprint to be compared to subsequent fingerprints as discussed below in reference to FIGS. 5 and 6. Log fingerprint operation 416 is optional and in one embodiment is not performed such that flow moves directly to operation 418 instead of operation 416.

From log fingerprint operation 416, flow moves to an exit operation 418 and flow returns to virus threshold exceeded check operation 218 of FIG. 2.

Returning again to suspicious fingerprint check operation 410, if a determination is made that the fingerprint is not suspicious, flow moves from suspicious fingerprint check operation 410 to log fingerprint operation 416, which is performed as discussed above.

Returning again to known false positive check operation 412, if a determination is made that the fingerprint matches a known false positive fingerprint, flow moves from known false positive check operation 412 to log fingerprint operation 416, which is performed as discussed above.

Figure 5:
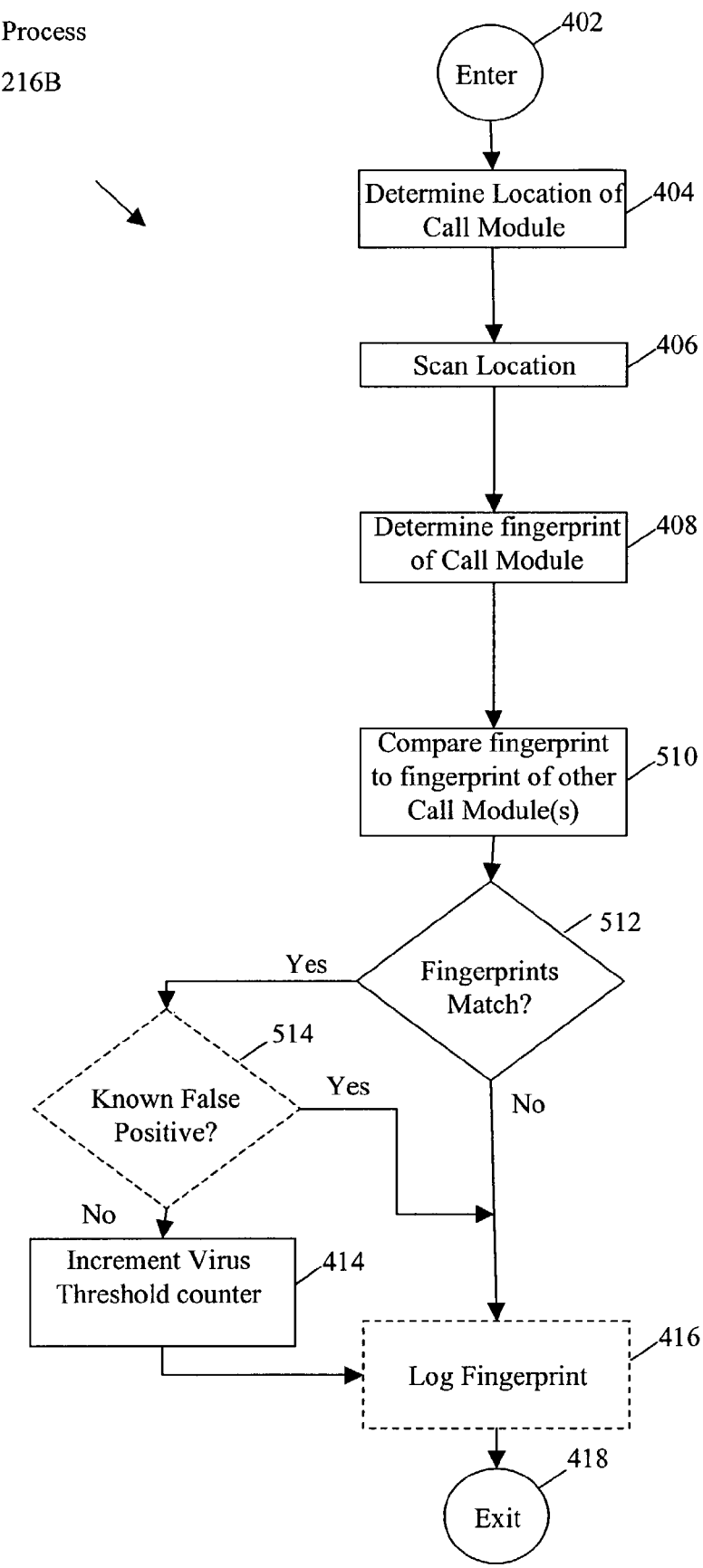

FIG. 5 is a flow diagram of a process 216B of analyze call module characteristics and increment virus threshold counter operation 216 of FIG. 2 in accordance with another embodiment of the present invention. Referring now to FIGS. 2, 3 and 5 together, operations 402, 404, 406, and 408 are performed as discussed above in reference to FIG. 4.

From determine fingerprint of call module operation 408, flow moves to a compare fingerprint to fingerprint of other call module(s) operation 510. In compare fingerprint to fingerprint of other call module(s) operation 510, the fingerprint is compared to fingerprints of other call modules to determine whether there are any matches between fingerprints. Generally, the fingerprint is compared to at least one other fingerprint of another call module in compare fingerprint to fingerprint of other call module(s) operation 510. Illustratively, the actual code comparison is synchronized according to the critical OS function call instruction(s) as well as suspicious code fragment entry points.

More particularly, if a virus or other malicious code has appended itself to more than one active application, the call modules of the virus in the active applications would be the same or similar. An active application is an application that is loaded into virtual memory in accordance with one embodiment. Thus, by comparing fingerprints of call modules of applications originating critical OS function calls, it is possible to detect otherwise unknown viruses or other malicious code. This is true even if a single fingerprint alone does not contain enough suspicious code in accordance with one embodiment.

In one embodiment, the fingerprint is compared to fingerprints of other call modules of active applications to determine whether there are any matches between fingerprints. However, in another embodiment, the fingerprint is compared to fingerprints of other call modules of inactive applications, which were previously active, to determine whether there are any matches between fingerprints. For example, the fingerprints of other call modules of inactive applications are logged in log fingerprint operation 416 (FIGS. 4 and 5).

In one embodiment, suspicious parameters, suspicious code fragments, or other characteristics of the call module are compared to the fingerprints of the other call modules in compare fingerprint to fingerprint of other call module(s) operation 510. For example, in the embodiment illustrated FIG. 3, the fingerprints of the other call modules are analyzed to determine if the suspicious parameter of instruction 308 is present in the other call modules.

From compare fingerprint to fingerprint of other call module(s) operation 510, flow moves to a fingerprints match check operation 512. In fingerprints match check operation 512, a determination is made as to whether the fingerprint matches at least one other fingerprint. If the fingerprint does not match at least one other fingerprint, flow moves from fingerprints match check operation 512 to, optionally, log fingerprint operation 416. Log fingerprint operation 416 and exit operation 418 are performed as discussed above in reference to FIG. 4.

However, returning again to fingerprints match check operation 512, if a determination is made that the fingerprint matches at least one other fingerprint, flow moves from fingerprints match check operation 512 to, optionally, a known false positive check operation 514. Known false positive check operation 514 is optional and in one embodiment is not performed.

Illustratively, if the fingerprints match exactly or substantially match, then a determination is made that the fingerprints match in fingerprints match check operation 512. For example, in the embodiment illustrated FIG. 3, assume that at least one fingerprint of another call module contains the suspicious parameter of instruction 308. Thus, a determination is made that the fingerprint matches at least one other fingerprint in fingerprints match check operation 512 and flow moves to known false positive check operation 514.

In known false positive check operation 514, a determination is made as to whether the fingerprint match is a known false positive fingerprint match. In one embodiment, a known false positive fingerprint match is a fingerprint match that is, in fact, safe, i.e., the location of the call module is known not to contain malicious code.

If a determination is made that the fingerprint match is not a known false positive fingerprint match in known false positive check operation 514, flow moves to increment virus threshold counter operation 414. Increment virus threshold counter operation 414 is performed in the same or similar manner as discussed above in reference to FIG. 4 and the virus threshold counter is incremented.

As discussed above in reference to virus threshold exceeded check operation 218 of FIG. 2, if the virus threshold counter exceeds the virus threshold, the host computer system user/administrator are notified that malicious code is possibly executing on host computer system 102A in notify host computer system user/administrator operation 220.

Flow moves from increment virus threshold counter operation 414 to, optionally, log fingerprint operation 416. Log fingerprint operation 416 and exit operation 418 are performed as discussed above in reference to FIG. 4.

Returning again to known false positive check operation 514, if a determination is made that the fingerprint match is a known false positive fingerprint match, flow moves from known false positive check operation 514 to, optionally, log fingerprint operation 416, which is performed as discussed above.

Figure 6:
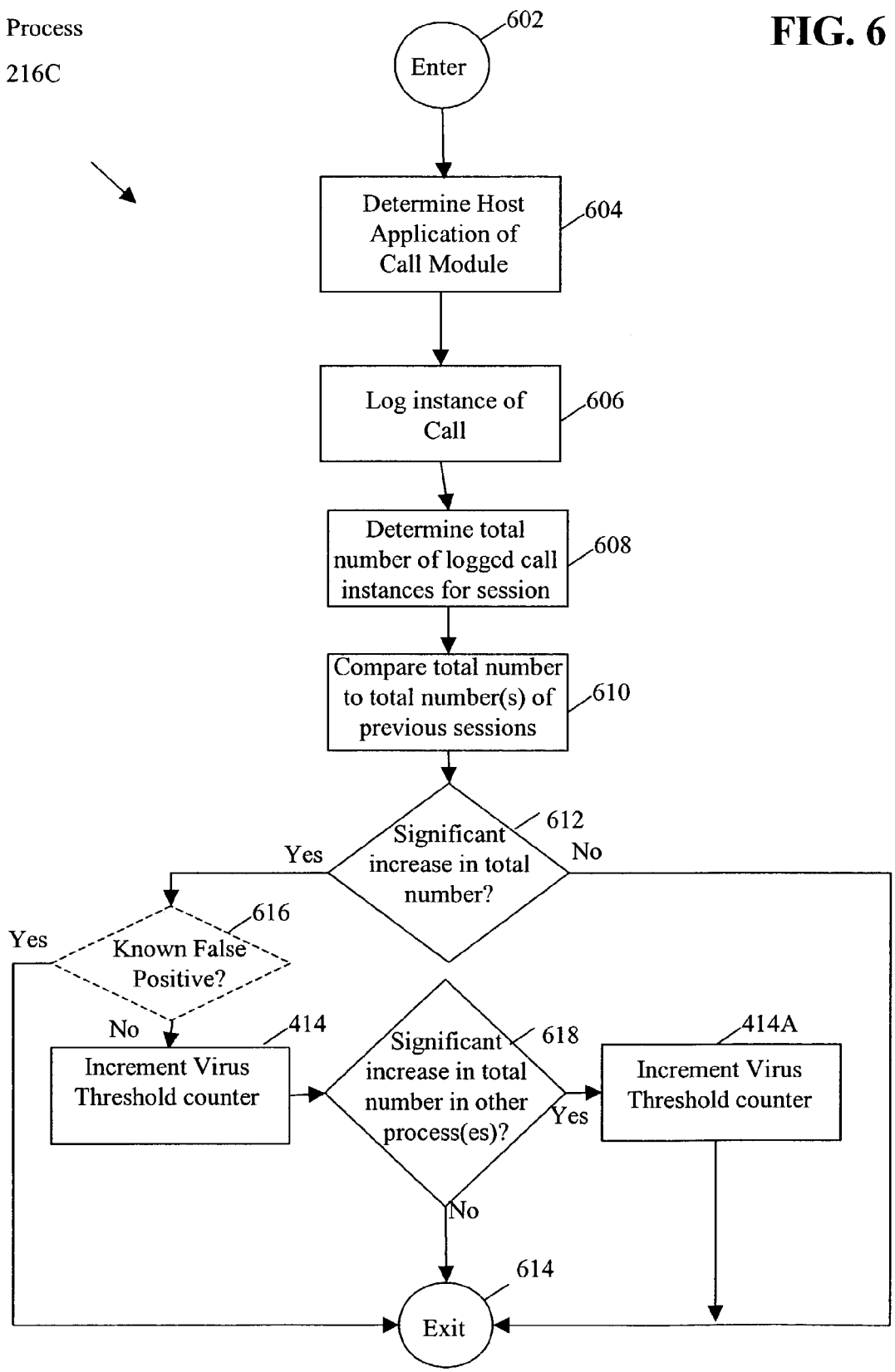
Figure 7A:
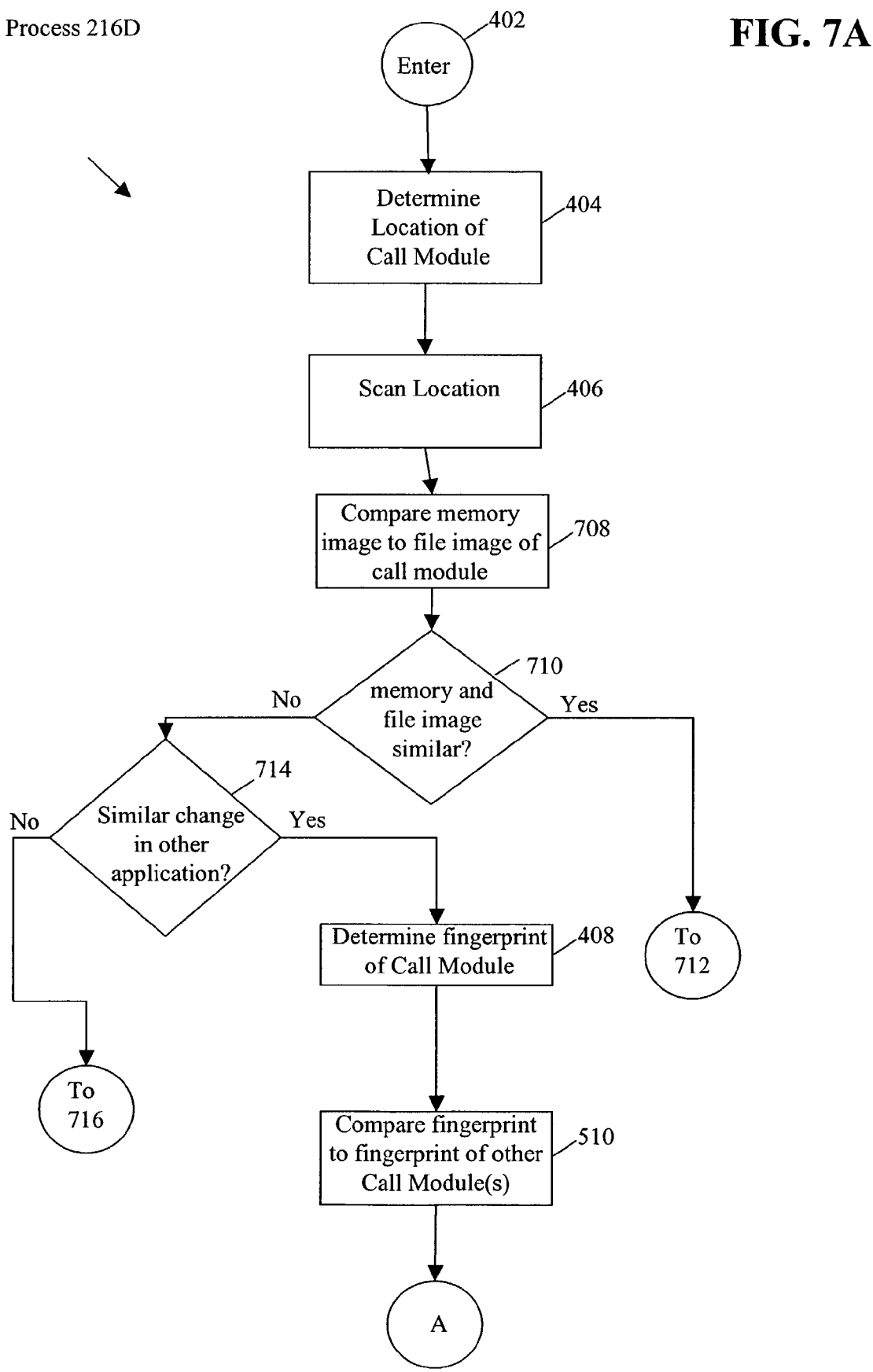
FIG. 7 is a key to FIGS. 7A and 7B, which are a flow diagram of a process of the analyze call module characteristics and increment virus threshold counter operation of FIG. 2 in accordance with another embodiment of the present invention.
Figure 7B:
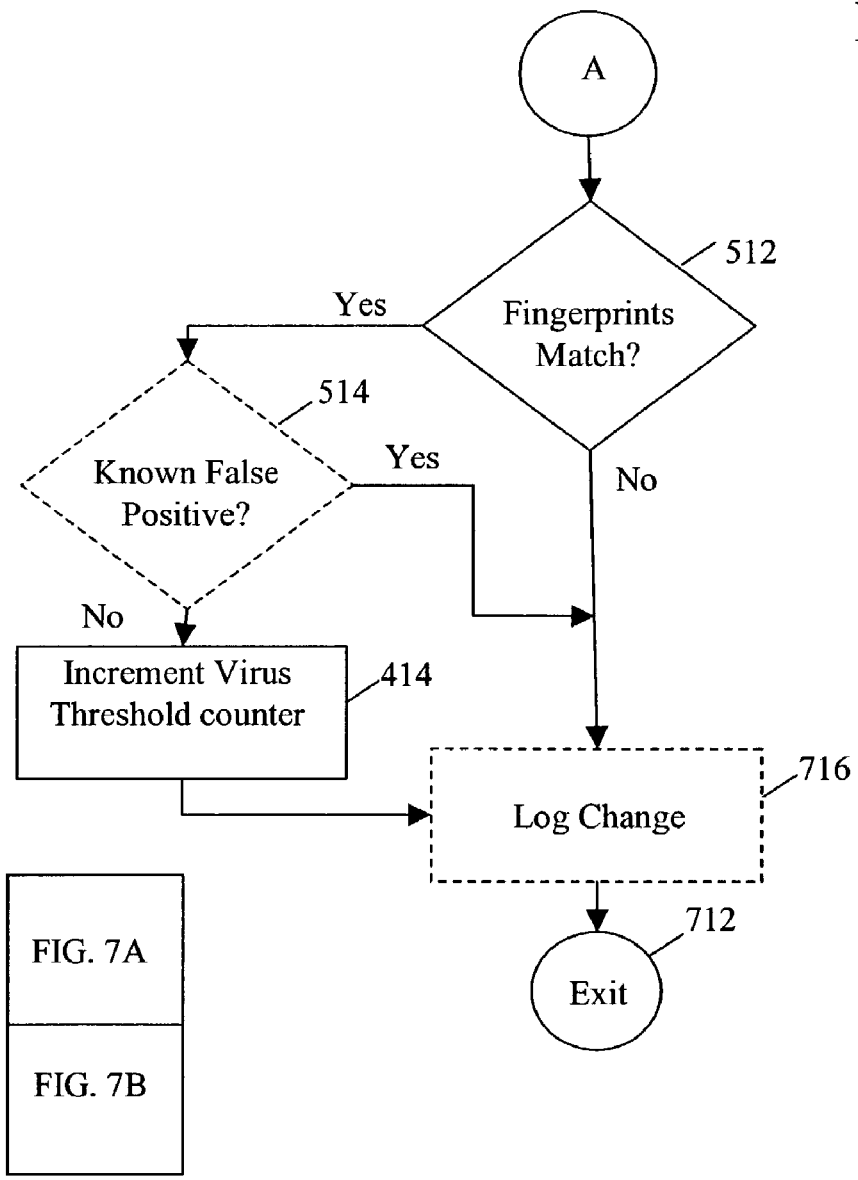

FIG. 6 is a flow diagram of a process 216C of analyze call module characteristics and increment virus threshold counter operation 216 of FIG. 2 in accordance with one embodiment of the present invention. Referring now to FIGS. 2 and 6 together, from an enter operation 602, flow moves to a determine host application of call module operation 604. In determine host application of call module operation 604, the host application of the call module is determined. For example, a stack trace back is used as discussed above in reference to determine location of call module operation 404 of FIG. 4.

From determine host application of call module operation 604, flow moves to a log instance of call operation 606. In log instance of call operation 606, the instance, sometimes called occurrence, of the critical OS function call is logged. In one embodiment, referring to FIG. 2, call threshold exceeded check operation 208 and new instance of call check operation 214 are not performed such that flow moves directly from operation 206 to operation 212 to operation 216 although operations 208 and/or 214 are performed in other embodiments.

From log instance of call operation 606, flow moves to a determine total number of logged call instances for session operation 608. In determine total number of logged call instances for session operation 608, the total number of logged call instances, sometimes referred to as the total number, is determined. In one embodiment, each call instance increments a call instance counter and this counter is read in determine total number of logged call instances for session operation 608.

From determine total number of logged call instances for session operation 608, flow moves to a compare total number to total number(s) of previous sessions operation 610. In compare total number to total number(s) of previous sessions operation 610, the total number is compared to the total number of logged call instances for at least one previous session of the host application. More particularly, a determination is made as to whether the total number is approximately equal to or significantly greater than the total number of logged call instances for at least one previous session of the host application.

To illustrate, if the host application remains uninfected, i.e., does not have malicious code appended, it is expected that the total number of instances of critical OS function calls for any session of the host application should remain approximately equal. In one embodiment, a session refers to loading of the host application as an active process, sometimes called active application, into memory. Upon termination of the active process, the session is ended.

To further illustrate, if the host application becomes infected, i.e., has malicious code appended, it is expected that the total number of instances of critical OS function calls for any session of the host application should significantly increase as a result of the additional critical OS function calls originating from the malicious code. For example, the infected host application may originate a critical OS function call that the host application would not originate if the host application was not infected.

From compare total number to total numbers of previous session(s) operation 610, flow moves to a significant increase in total number check operation 612. In significant increase in total number check operation 612, a determination is made as to whether a significant increase in the total number compared to the total numbers of previous sessions has occurred.

If a determination is made that there is not a significant increase in the total number in significant increase in total number check operation 612, flow moves to an exit operation 614 and exits thus returning to virus threshold exceeded check operation 218 of FIG. 2.

However, if a determination is made that there is a significant increase in the total number in significant increase in total number check operation 612, flow moves to, optionally, a known false positive check operation 616. In one embodiment, a significant increase in the total number is defined as 20 or more extra calls to critical OS functions.

In known false positive check operation 616, a determination is made as to whether the significant increase in total number is a known false positive significant increase in total number. For example, it may be the case that a particular host application is known to have wide variances in the total number of instances from session to session. Accordingly, a significant increase for this particular host application would be a known false positive. Known false positive check operation 616 is optional and in one embodiment is not performed.

If a determination is made that the significant increase in total number is a known false positive significant increase in total number, flow moves from known false positive check operation 616 to exit operation 614.

However, if a determination is made that the significant increase in total number is not a known false positive, flow moves from known false positive check operation 616 to increment virus threshold counter operation 414. Increment virus threshold counter operation 414 is performed in the same or similar manner as discussed above in reference to FIG. 4 and the virus threshold counter is incremented.

From increment virus threshold counter operation 414, flow moves to a significant increase in total number in other process(es) check operation 618. In significant increase in total number in other process(es) check operation 618, a determination is made as to whether at least one other process has had a significant increase in the total number.

More particularly, if malicious code is spreading on host computer system 102A and infecting a plurality of host applications, it is expected that as the host applications become infected, i.e., have malicious code appended, that the total number of instances of critical OS function calls from the host applications should significantly increase as a result of the additional critical OS function calls originating from the spreading malicious code.

Accordingly, if a determination is made that there is a significant increase in the total number in a least one other process in significant increase in total number in other process(es) check operation 618, flow moves to an increment virus threshold counter operation 414A. In increment virus threshold counter operation 414A, the virus threshold counter is again incremented in the same or similar manner as discussed above in reference to increment virus threshold counter operation 414 of FIG. 4. From increment virus threshold counter operation 414A, flow moves to and exits at exit operation 614.

Return again to significant increase in total number in other process(es) check operation 618, if a determination is made that there is not a significant increase in the total number in at least one other process, flow moves to and exits at exit operation 614.

FIG. 7 is a key to FIGS. 7A and 7B, which are a flow diagram of a process 216D of analyze call module characteristics and increment virus threshold counter operation 216 of FIG. 2 in accordance with another embodiment of the present invention. Referring now to FIGS. 2 and 7 together, operations 402, 404, and 406 are performed as discussed above in reference to FIG. 4.

From scan location operation 406, flow moves to a compare memory image to file image of call module operation 708. In compare memory image to file image of call module operation 708, the call module in virtual memory (the call module in virtual memory is sometimes called the memory image of the call module) is compared to the call module as a file image on disk, e.g., on the hard disk drive.

From compare memory image to file image of call module operation 708, flow moves to a memory and file image similar check operation 710. In memory and file image similar check operation 710, a determination is made as to whether the memory image and the file image of the call module are similar.

If malicious code has appended itself to an application as it is loaded into virtual memory, it is expected that the amount of code associated with the application in virtual memory will be greater than the amount of code associated with the application as a file image on disk. Conversely, an uninfected application loaded into virtual memory should have approximately the same amount of code as the application has in the file image.

If a determination is made that the memory image and the file image of the call module are similar in memory and file image similar check operation 710, flow moves to and exits at exit operation 712 and returns to virus threshold exceeded check operation 218.

However, if a determination is made that the memory image and the file image of the call module are not similar in memory and file image similar check operation 710, e.g., the memory image has a significantly greater amount of code than the file image, flow moves to a similar change in other application check operation 714.

In similar change in other application check operation 714, a determination is made as to whether a similar change has occurred in at least one other application. In one embodiment, records are made, e.g., in a database, about the modifications between the memory and file images of call modules as discussed below in log change operation 716. The virtual address of the location of the call module is also saved as part of the record.

If a determination is made that a similar change has not occurred in at least one other application in similar change in other application check operation 714, flow moves to log change operation 716, which is performed as discussed below. If a determination is made that a similar change has occurred in at least one other application in similar change in other application check operation 714, flow moves to determine fingerprint of call module operation 408. Operations 408, 510, 512, 514, and/or 414 are performed as discussed above in reference to FIG. 5 with the exception being that flow moves to log change operation 716.

In log change operation 716, a record is made of the modifications between the memory image and the file image as well as the virtual address of the location of the call module. As discussed above, these records are used in similar change in other application check operation 714. From log change operation 716, flow moves to exit operation 712, which is performed as discussed above.

Figure 8A:
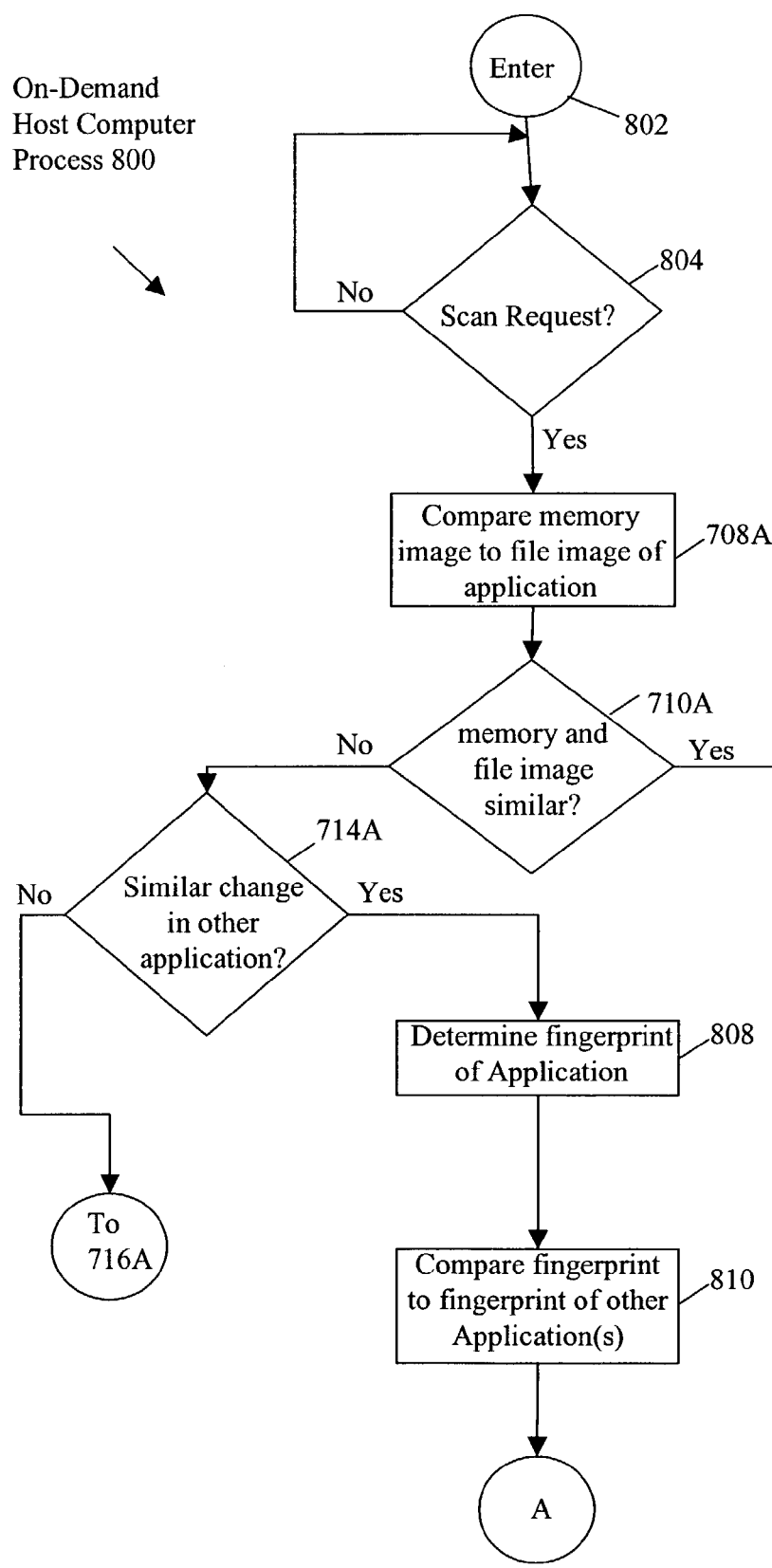
FIG. 8 is a key to FIGS. 8A and 8B, which are a flow diagram of an on-demand host computer process in accordance with another embodiment of the present invention.
Figure 8B:
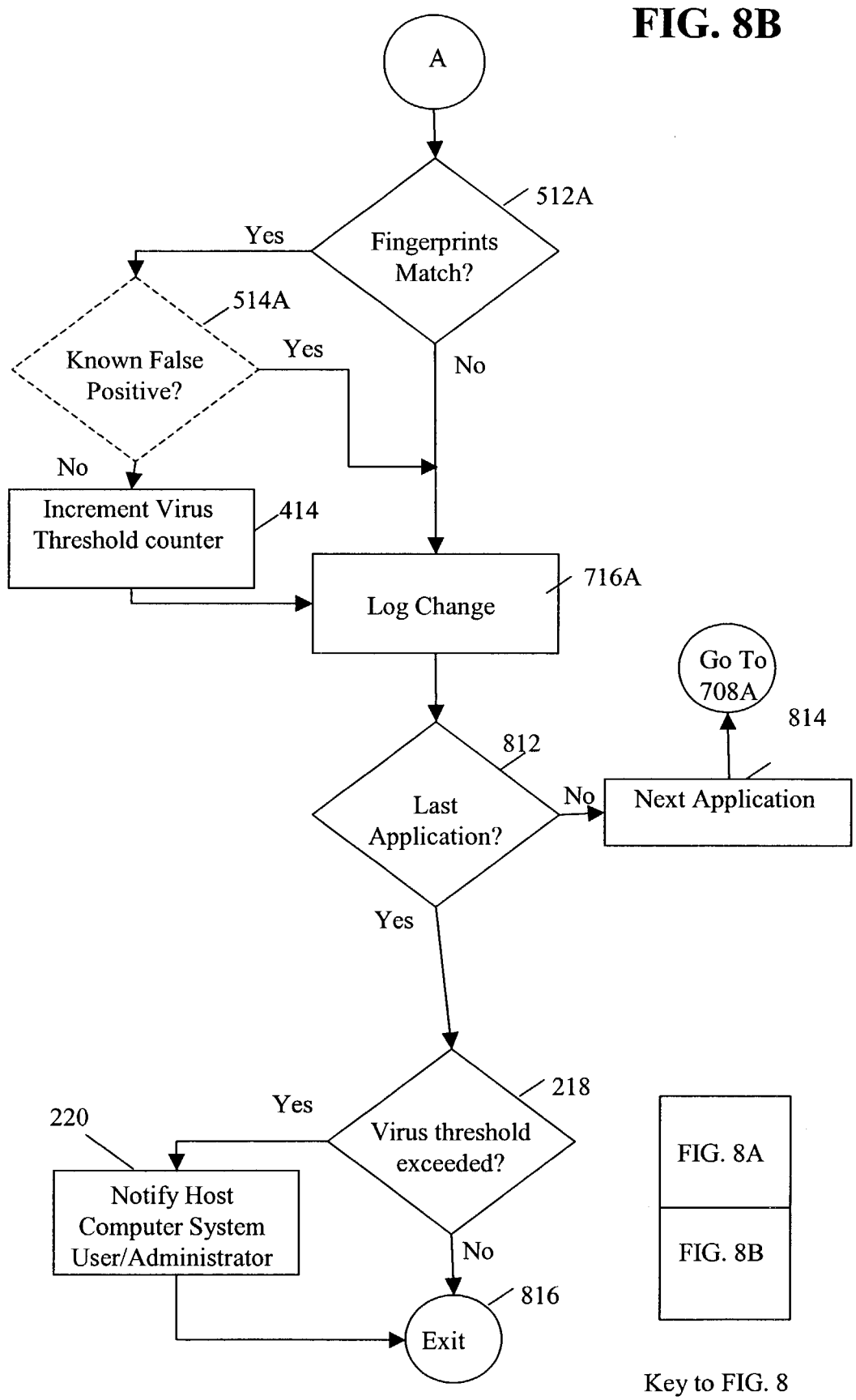

FIG. 8 is a key to FIGS. 8A and 8B, which are a flow diagram of an on-demand host computer process 800 in accordance with another embodiment of the present invention. Referring now to FIGS. 1 and 8 together, execution of anti-virus application 106 by processor 108 results in the operations of on-demand host computer process 800 as described below in one embodiment.

From an enter operation 802, flow moves to a scan request check operation 804. In scan request check operation 804, a determination is made as to whether a request for a scan has been made. Illustratively, a user of host computer 102A or a program scheduler makes a request for a scan. If a determination is made that a request for a scan has not been made, flow remains at scan request check operation 804.

If a determination is made that a request for a scan has been made, flow moves from scan request check operation 804 to a compare memory image to file image of application operation 708A. In compare memory image to file image of application operation 708A, an application in virtual memory, sometimes called the memory image of the application, is compared to the application on the disk as a file image.

From compare memory image to file image of application operation 708A, flow moves to a memory and file image similar check operation 710A. In memory and file image similar check operation 710A, a determination is made as to whether the memory image and the file image of the application are similar.

If a determination is made that the memory image and the file image of the application are similar in memory and file image similar check operation 710A, flow moves to a last application check operation 812, which is discussed further below.

However, if a determination is made that the memory image and the file image of the application are not similar in memory and file image similar check operation 710A, e.g., the memory image has a significantly greater amount of code than the file image, flow moves to a similar change in other application check operation 714A.

In similar change in other application check operation 714A, a determination is made as to whether a similar change has occurred in at least one other application. In one embodiment, records are made, e.g., in a database, about the modifications between the memory and file images of applications as discussed below in a log change operation 716A.

If a determination is made that a similar change has not occurred in at least one other application in similar change in other application check operation 714A, flow moves to log change operation 716A, which is performed as discussed below. If a determination is made that a similar change has occurred in at least one other application in similar change in other application check operation 714A, flow moves to determine fingerprint of application operation 808.

In determine fingerprint of application operation 808, the fingerprint, sometimes called characteristics, of the application is determined. Illustratively, the fingerprint includes code fragments or other characteristics of the application.

From determine fingerprint of application operation 808, flow moves to a compare fingerprint to fingerprint of other application(s) operation 810. In compare fingerprint to fingerprint of other application(s) operation 810, the fingerprint is compared to fingerprints of other applications to determine whether there are any matches between fingerprints. Generally, the fingerprint is compared to at least one other fingerprint of another application in compare fingerprint to fingerprint of other application(s) operation 810.

From compare fingerprint to fingerprint of other application(s) operation 810, flow moves to a fingerprints match check operation 512A. In fingerprints match check operation 512A, a determination is made as to whether the fingerprint matches at least one other fingerprint. If the fingerprint does not match at least one other fingerprint, flow moves from fingerprints match check operation 512A to, optionally, log change operation 716A.

In log change operation 716A, a record is made of the modifications between the memory image and the file image of the application. As discussed above, these records are used in similar change in other application check operation 714A.

However, returning again to fingerprints match check operation 512A, if a determination is made that the fingerprint matches at least one other fingerprint, flow moves from fingerprints match check operation 512A to, optionally, a known false positive check operation 514A. Known false positive check operation 514A is optional and in one embodiment is not performed.

In known false positive check operation 514A, a determination is made as to whether the fingerprint match is a known false positive fingerprint match. In one embodiment, a known false positive fingerprint match is a fingerprint match that is, in fact, safe, i.e., the application is known not to contain malicious code.

If a determination is made that the fingerprint match is not a known false positive fingerprint match in known false positive check operation 514A, flow moves to increment virus threshold counter operation 414. Increment virus threshold counter operation 414 is performed in the same or similar manner as discussed above in reference to FIG. 4 and the virus threshold counter is incremented. Flow moves from increment virus threshold counter operation 414 to log change operation 716A.

Returning again to known false positive check operation 514A, if a determination is made that the fingerprint match is a known false positive fingerprint match, flow moves from known false positive check operation 514A to log change operation 716A. From log change operation 716A, flow moves to last application check operation 812.

In last application check operation-812, a determination is made as to whether the application is the last application in virtual memory that has not had the application's memory and file images compared in compare memory image to file image of application operation 708A. If a determination is made that the application is not the last application, flow moves to a next application operation 814.

In next application operation 814, the next active application is selected. Flow returns from next application operation 814 to compare memory image to file image of application operation 708A. Operations 708A, 710A, 714A, 808, 810, 512A, 514A, 414, and/or 716A are performed as discuss above on the application selected in next application operation 814.

If a determination is made in last application check operation 812 that the application is the last application, flow moves to virus threshold exceeded check operation 218. Operations 218 or operations 218 and 220 are performed as discussed above in reference to FIG. 2 and flow moves to and exits at exit operation 816.

In the above manner, an on-demand comparison of the memory image to file image of the active applications is performed in accordance with one embodiment. Viruses which "sleep" in an application in virtual memory, sometimes called a process, in an already activated form are readily detected even before the virus generates any operating system function calls.

Figure 9:
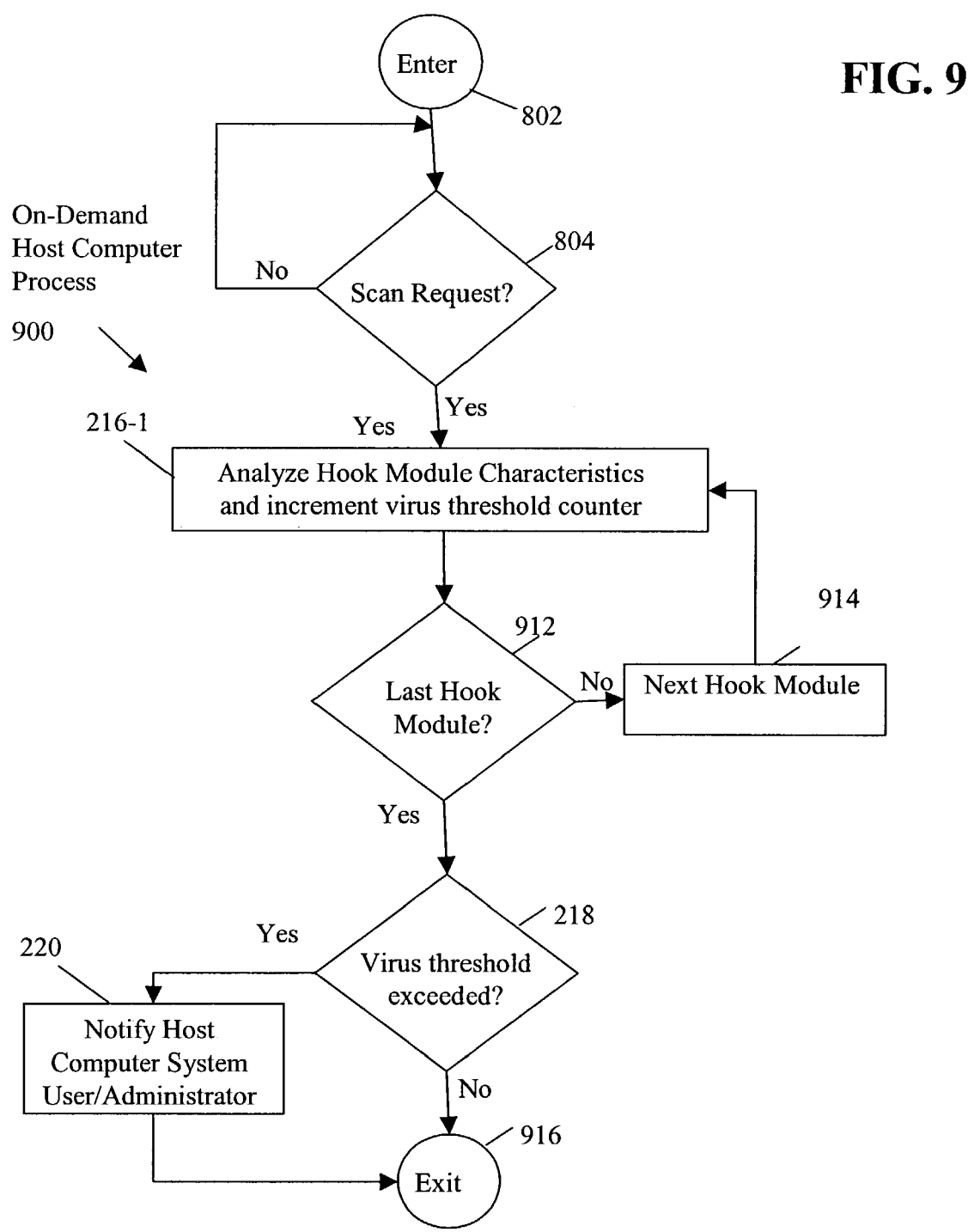
FIG. 9 is a flow diagram of an on-demand host computer process in accordance with yet another embodiment of the present invention.

FIG. 9 is a flow diagram of an on-demand host computer process 900 in accordance with another embodiment of the present invention. Referring now to FIGS. 1 and 9 together, execution of anti-virus application 106 by processor 108 results in the operations of on-demand host computer process 900 as described below in one embodiment.

Operations 802 and 804 are performed as discussed above in reference to FIG. 8. If a determination is made that a request for a scan has been made, flow moves from scan request check operation 804 to an analyze hook module characteristics and increment virus threshold counter operation 216-1. In operation 216-1, (1) the characteristics of hook modules are analyzed for indications of suspicious content and a virus threshold counter is incremented appropriately; (2) the characteristics of the hook modules are compared to other hook module characteristics for indications of suspicious content and the virus threshold counter is incremented appropriately; (3) the characteristics of the host application of the hook modules are compared to the previous characteristics of the host application of the hook modules for indications of suspicious content and the virus threshold counter is incremented appropriately; and/or (4) the memory and file image of the hook modules are compared to each other for indications of suspicious content and the virus threshold counter is incremented appropriately in a manner similar to that discussed above in reference to FIGS. 4, 5, 6, and 7 with a noted exception being that the operations are performed on a hook module instead of a call module.

More particularly, a hook module includes an instruction or set of instructions, which hook operating system functions. Many viruses such as Windows® 95 viruses hook operating system functions. By analyzing the hook module characteristics and incrementing the virus threshold counter appropriately, malicious code is easily detected. For example, kernel mode code areas are monitored for CIH like viruses that are active in the kernel mode memory area only using host computer process 900.

In one embodiment, a tracer for the IFSMgr_InstallFileSystemApiHook chain under Windows® 95/98 is used.

In last hook module check operation 912, a determination is made as to whether the hook module is the last hook module that has not been analyzed in analyze hook module characteristics and increment virus threshold counter operation 216-1. If a determination is made that the hook module is not the last hook module, flow moves to a next hook module operation 914.

In next hook module operation 914, the next hook module to be analyzed is selected. Flow returns from next hook module operation 914 to analyze hook module characteristics and increment virus threshold counter operation 216-1. Analyze hook module characteristics and increment virus threshold counter operation 216-1 is performed as discuss above on the hook module selected in next hook module operation 914.

If a determination is made in last hook module check operation 912 that the hook module is the last hook module, flow moves to virus threshold exceeded check operation 218. Operations 218 or operations 218 and 220 are performed as discussed above in reference to FIG. 2 and flow moves to and exits at exit operation 916.

Referring again to FIG. 1, anti-virus application 106 is in computer memory 114. As used herein, a computer memory refers to a volatile memory, a non-volatile memory, or a combination of the two.

Although anti-virus application 106 is referred to as an application, this is illustrative only. Anti-virus application 106 should be capable of being called from an application or the operating system. In one embodiment, an application is generally defined to be executable code. Moreover, those of skill in the art will understand that when it is said that an application or an operation takes some action, the action is the result of executing one or more instructions by a processor. In one embodiment, anti-virus application 106 is implemented as a system level, e.g., kernel mode driver.

While embodiments in accordance with the present invention have been described for a client-server configuration, an embodiment of the present invention may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, anti-virus application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102A and/or server system 130 is a portable computer, a workstation, a two-way pager, a cellular telephone, a digital wireless telephone, a personal digital assistant, a server computer, an Internet appliance, or any other device that includes components that can execute the anti-virus functionality in accordance with at least one of the embodiments as described herein. Similarly, in another embodiment, host computer system 102A and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the anti-virus functionality in accordance with one embodiment of present invention can be implemented in a wide variety of computer system configurations. In addition, the anti-virus functionality could be stored as different modules in memories of different devices. For example, anti-virus application 106 could initially be stored in server system 130, and then as necessary, a portion of anti-virus application 106 could be transferred to host computer system 102A and executed on host computer system 102A. Consequently, part of the anti-virus functionality would be executed on processor 134 of server system 130, and another part would be executed on processor 108 of host computer system 102A. In view of this disclosure, those of skill in the art can implement various embodiments of the present invention in a wide-variety of physical hardware configurations using an operating system and computer programming language of interest to the user.

In yet another embodiment, anti-virus application 106 is stored in memory 136 of server system 130. Anti-virus application 106 is transferred over network 124 to memory 114 in host computer system 102A. In this embodiment, network interface 138 and I/O interface 110 would include analog modems, digital modems, or a network interface card. If modems are used, network 124 includes a communications network, and anti-virus application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
   determining that a call module originating a critical operating system function call has indications of suspicious content comprising:
      determining a host application of said call module;
      logging an instance of said critical operating system function call;
      determining a total number of logged call instances for a session of said host application; and
      determining that said total number is significantly greater than a total number of at least one previous session of said host application; and
   incrementing a virus threshold counter.

2. The method of claim 1 further comprising:
   hooking at least one critical operating system function, wherein said critical operating system function call is to said at least one critical operating system function.

3. The method of claim 1 further comprising:
   determining whether said critical operating system function call is a new instance.

4. The method of claim 1 further comprising:
   determining whether said virus threshold counter exceeds a virus threshold.

5. The method of claim 4 wherein upon a determination that said virus threshold counter exceeds said virus threshold, said method further comprising issuing a notification that malicious code may be executing on a host computer system.

6. The method of claim 5 wherein said notifying comprises requesting a sample of said malicious code be sent to a virus collection center.

7. The method of claim 1 wherein said determining that a call module originating a critical operating system function call has indications of suspicious content comprises:
   determining a location of said call module;
   scanning said location;
   determining a fingerprint of said call module; and
   determining that said fingerprint is suspicious.

8. The method of claim 1 wherein said determining that a call module originating a critical operating system function call has indications of suspicious content comprises:
   determining a location of said call module;
   scanning said location;
   determining a first fingerprint of said call module;
   comparing said first fingerprint to a second fingerprint of at least one other call module; and
   determining that said first fingerprint matches said second fingerprint.

9. A method comprising:
   determining that a call module originating a critical operating system function call has indications of suspicious content comprising:
      comparing a memory image to a file image of said call module;
      determining a change between said memory image and said file image;
      determining that a similar change between a memory image and a file image of another call module exists;
      comparing a first fingerprint of said call module to a second fingerprint of said another call module; and
      determining that said first fingerprint matches said second fingerprint; and
   incrementing a virus threshold counter.

10. A method comprising:
    determining that an application originating a critical operating system function call has indications of suspicious content comprising:
       comparing a memory image to a file image of an said application;
       determining a change between said memory image and said file image;
       determining that a similar change between a memory image and a file image of another application exists;
       comparing a first fingerprint of said application to a second fingerprint of said another application; and
       determining that said first fingerprint matches said second fingerprint; and
    incrementing a virus threshold counter.

11. A method comprising:
    comparing a memory image to a file image of an application;
    determining a change between said memory image and said file image;
    determining that a similar change between a memory image and a file image of another application exists;
    comparing a first fingerprint of said application to a second fingerprint of said another application;
    determining that said first fingerprint matches said second fingerprint;
    determining whether a match between said first fingerprint and said second fingerprint is a known false positive; and
    incrementing a virus threshold counter.

12. The method of claim 11 further comprising determining that a request for a scan has been made.

13. The method of claim 11 further comprising determining whether said virus threshold counter exceeds a virus threshold.

14. The method of claim 13 wherein upon a determination that said virus threshold counter exceeds said virus threshold, said method further comprising issuing a notification that malicious code may be executing on a host computer system.

15. A method comprising:
comparing a memory image to a file image of an application;
determining a change between said memory image and said file image;
determining that a similar change between a memory image and a file image of another application exists;
comparing a first fingerprint of said application to a second fingerprint of said another application;
determining that said first fingerprint matches said second fingerprint;
determining whether a match between said first fingerprint and said second fingerprint is a known false positive; and
logging said change between said memory image and said file image.

16. A method comprising:
determining that a hook module has indications of suspicious content comprising:
comparing a memory image to a file image of said hook module;
determining a change between said memory image and said file image;
determining that a similar change between a memory image and a file image of another hook module exists;
comparing a first fingerprint of said hook module to a second fingerprint of said another hook module; and
determining that said first fingerprint matches said second fingerprint; and
incrementing a virus threshold counter.

17. The method of claim 16 further comprising determining that a request for a scan has been made.

18. The method of claim 16 further comprising determining whether said virus threshold counter exceeds a virus threshold.

19. The method of claim 18 wherein upon a determination that said virus threshold counter exceeds said virus threshold, said method further comprising issuing a notification that malicious code may be executing on a host computer system.

20. The method of claim 16 wherein said hook module includes an instruction or set of instructions that hook operating system functions.

21. A method comprising:
determining whether a calls threshold is exceeded, wherein upon a determination that said calls threshold is exceeded during said determining, said method further comprising:
stalling a critical operating system function call originating from a call module; and
determining whether said critical operating system function call is a new instance, wherein upon a determination that said critical operating system function call is a new instance during said determining whether said critical operating system function call is a new instance, said method further comprising:
determining whether said call module has indications of suspicious content comprising:
determining a host application of said call module;
logging an instance of said critical operating system function call;
determining a total number of logged call instances for a session of said host application; and
determining that said total number is significantly greater than a total number of at least one previous session of said host application.

22. The method of claim 21 wherein upon a determination that said critical operating system function call is not a new instance during said determining whether said critical operating system function call is a new instance, said method further comprising:
allowing said call to proceed.

23. The method of claim 21 wherein upon a determination that said call module does have indications of suspicious content during said determining whether said call module has indications of suspicious content, said method further comprising:
incrementing a virus threshold counter.

24. The method of claim 23 further comprising determining whether said virus threshold counter exceeds a virus threshold.

25. The method of claim 24 wherein upon a determination that said virus threshold counter exceeds said virus threshold during said determining whether said virus threshold counter exceeds a virus threshold, said method further comprising:
issuing a notification that malicious code may be executing on a host computer system.

26. The method of claim 21 further comprising updating a known instances of critical operating system function calls by logging characteristics of said critical operating system function call.

27. A computer system comprising:
a means for determining that a call module originating a critical operating system function call has indications of suspicious content comprising:
a means for determining a host application of said call module;
a means for logging an instance of said critical operating system function call;
a means for determining a total number of logged call instances for a session of said host application; and
a means for determining that said total number is significantly greater than a total number of at least one previous session of said host application; and
a means for incrementing a virus threshold counter.

28. A computer-program product comprising a computer-readable medium containing computer program code comprising:
an anti-virus application for determining that a call module originating a critical operating system function call has indications of suspicious content comprising:
determining a host application of said call module;
logging an instance of said critical operating system function call;
determining a total number of logged call instances for a session of said host application; and
determining that said total number is significantly greater than a total number of at least one previous session of said host application;
said anti-virus application further for incrementing a virus threshold counter if said call module has indications of suspicious content;
said anti-virus application further for determining whether said virus threshold counter exceeds a virus threshold; and
said anti-virus application further for issuing a notification that malicious code may be executing on a host computer system if said virus threshold counter exceeds said virus threshold.

\* \* \* \* \*

UNITED STATES PATENT AND TRADEMARK OFFICE
CERTIFICATE OF CORRECTION

| | | |
|---|---|---|
| PATENT NO. | : 7,340,777 B1 | Page 1 of 1 |
| APPLICATION NO. | : 10/404167 | |
| DATED | : March 4, 2008 | |
| INVENTOR(S) | : Peter Szor | |

It is certified that error appears in the above-identified patent and that said Letters Patent is hereby corrected as shown below:

In Column 20, Line 30, Claim 10, after "image of", delete "an".

Signed and Sealed this

Fourth Day of November, 2008

JON W. DUDAS
*Director of the United States Patent and Trademark Office*